(No Model.)
D. C. TERRY.
NUT LOCK.
No. 471,627. Patented Mar. 29, 1892.
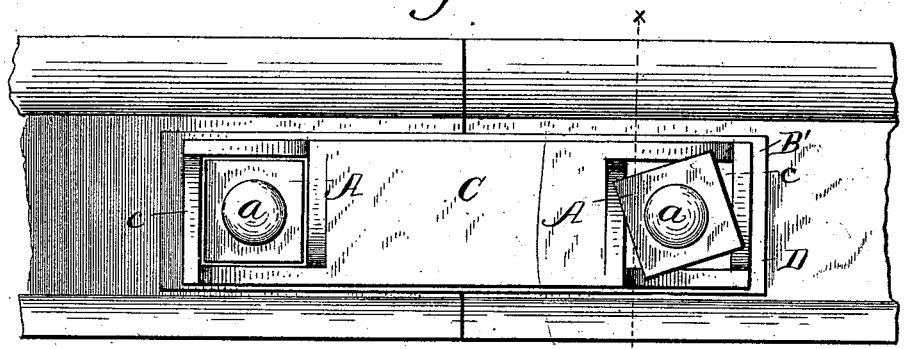
Fig. I.
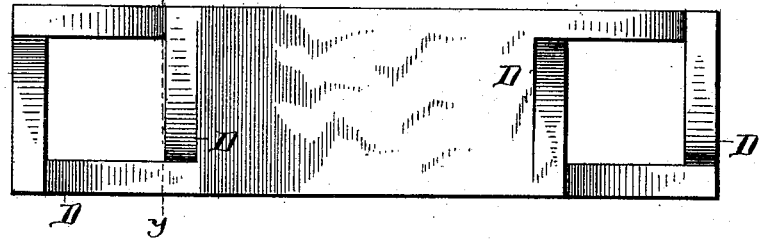
Fig. II.
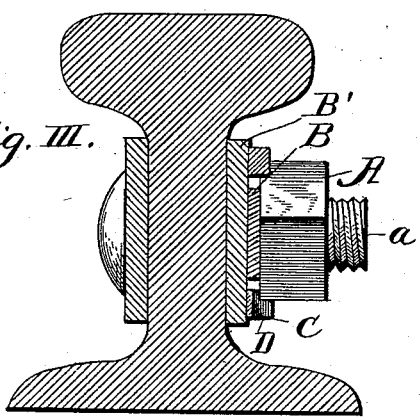
Fig. III.
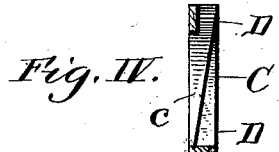
Fig. IV.
Fig. V.
Witnesses:
J. B. McGirr.
William O. Bett.
Inventor:
David C. Terry,
By his Attorneys,
Edson Bros.

UNITED STATES PATENT OFFICE.

DAVID CROCKETT TERRY, OF ABILENE, TEXAS, ASSIGNOR OF ONE-HALF TO FRANK FOSTER, OF SAME PLACE.

NUT-LOCK.

SPECIFICATION forming part of Letters Patent No. 471,627, dated March 29, 1892.

Application filed November 4, 1891. Serial No. 410,870. (No model.)

*To all whom it may concern:*

Be it known that I, DAVID CROCKETT TERRY, a citizen of the United States, residing at Abilene, in the county of Taylor and State of Texas, have invented certain new and useful Improvements in Nut-Locks; and I do hereby declare the following to be a full, clear, and exact description of the invention, such as will enable others skilled in the art to which it appertains to make and use the same.

My present invention relates to improvements in means for securing nuts on their bolts in a firm and rigid manner; and it is especially adapted for use on railway-rails in which the locking devices are subjected to severe and continual jarring.

With these and other ends in view my invention consists in providing an ordinary round or square washer, which is arranged beneath the nut. A locking-plate having one or more openings therein is placed over the nuts and rests in place against the fish-plate on the rail and around the aforementioned washers. The sides of these openings are inclined in a reverse direction to the advance of the nuts, and when the nuts have been tightened and the locking-plate arranged in position the nuts are turned back and the edges or corners thereof are forced up on the inclined planes of the sides of the openings in said plate. These inclined planes commence at each corner of the opening and extend backward or in a reverse direction to the advance of the nut to the opposite corner of said opening, and the upper surface of these inclined planes is level and may extend entirely across the narrow sides of the openings.

To enable others to more readily understand my invention, I have illustrated the same in the accompanying drawings as applied to a rail-joint, in which—

Figure I is a side elevation showing the locking-plate in position. Fig. II is a detail view of said locking-plate. Fig. III is a sectional view on the line $x\,x$ of Fig. I, and Fig. IV is a sectional view on the line $y\,y$ of Fig. II. Fig. V is a detail view of the washer.

Referring to the drawings, in which like letters of reference denote corresponding parts in all the figures, A designates the nuts of ordinary form and construction, but preferably having four straight sides, as shown, and they are arranged to be tightly screwed on the bolts $a$, firmly against washers B, fitted thereon. These washers are preferably round and may be provided with studs or projections $b$, as shown in Fig. V, and the diameter of these washers is substantially the same as the diameter of the nuts and they do not project beyond the sides thereof.

The locking-plate consists of a strip of hard flat-metal plate C of any desired dimensions, and it is provided with one or more openings $c$, which conform to the shape of the nuts and are somewhat larger, to enable said plate to be slipped easily and readily over said nuts. The inner edges of these openings $c$ are inclined on each side thereof, as at D, and the inclines begin at each corner and extend in a reverse direction to the advance of the nut to the other corner of each side. The incline is very gradual, and the upper surface thereof is perfectly level transversely across the sides.

In practice the nuts are tightened on the bolts and arranged so that the sides of the nuts are parallel, and the locking-plate is then placed over them. The thickness of the washer is equal to the height of the lower end of the incline, so that when the locking-plate is in position the corners of the nut can be easily and readily forced onto the incline. The nut is then turned backward and the corners thereof will be forced up the incline to any point desired, where it will remain in a firm and rigid position. In this position it is obvious that the nut can neither turn forward nor backward by any unusual or usual jarring and will remain in this position until released in the proper manner.

The incline of the edges of the openings $c$ is greater than the pitch of the thread of the bolt, and hence when the nut is forced up on said inclines the frictional contact occasioned by these different angles of the thread on the bolt and inclines on the locking-plate will be materially increased and the nut firmly and rigidly locked in place.

I am aware of the Patent No. 370,588, in which is employed a nut tapered longitudinally and laterally and a locking-plate having hexagonal openings, the sides of which are inclined to the axes of said openings, and Patent No. 438,748, which discloses a locking-plate having a slot wider than the nut and so arranged that when the nut is in position it bears against the plate on one side of the bolt and is depressed into the slot on the other side, thus bending the bolt, and also Patent No. 131,755, which shows a locking-plate arranged in place over the nuts and having lips or projections turned up about the center of each side of the openings therein, against which the corners or sides of the nut impinge when said nut is forced back.

It is obvious that the construction of my improvement is different from those above mentioned and the advantages presented in the peculiar arrangement and pitch of the inclines are many and important.

The washers B may be made integral with the fish-plate B' or the rails, or they may be separate therefrom, as shown in the drawings.

Having thus fully described my invention, what I claim as new, and desire to secure by Letters Patent, is—

1. The combination, with a nut and bolt, of a washer fitted on the bolt beneath the nut, and a locking-plate having openings adapted to fit around said washers, the edges of said openings being inclined rearwardly and the height of the lower end thereof being equal to the thickness of the washer, substantially as described.

2. The combination of the bolts, the washers fitted thereon, the nut, and the locking-plate having openings adapted to fit over the nuts and around the washers, the edges of said openings being inclined backward, the corners of said nut being arranged to be forced up on the inclines, substantially as described.

3. As an improved article of manufacture, a locking-plate and a nut-opening in said plate each side of the opening being inclined from one corner of said opening to the opposite corner, as and for the purpose specified.

In testimony whereof I affix my signature in presence of two witnesses.

DAVID CROCKETT TERRY.

Witnesses:
ED S. HORNE,
GEO. W. HATCH.